Patented Jan. 6, 1953

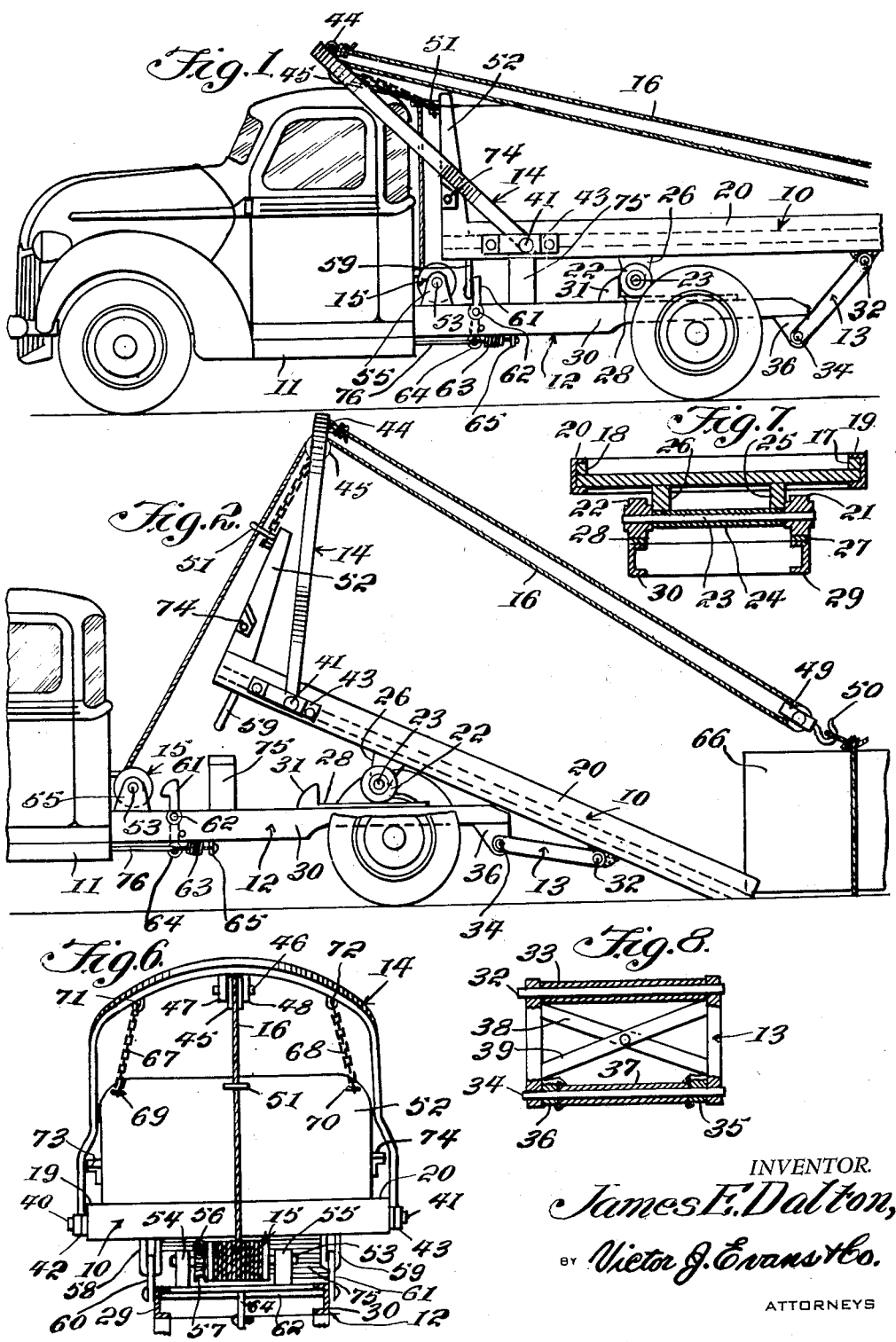

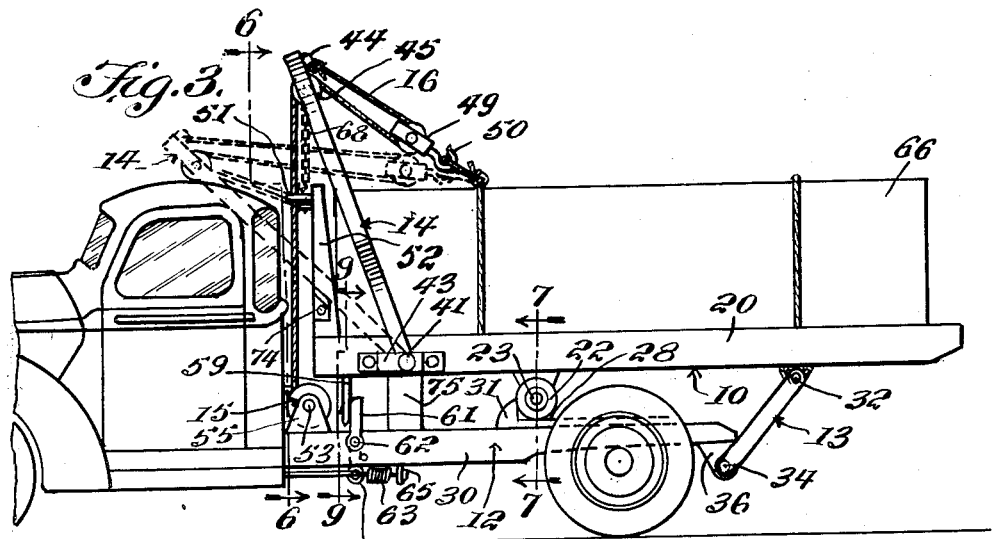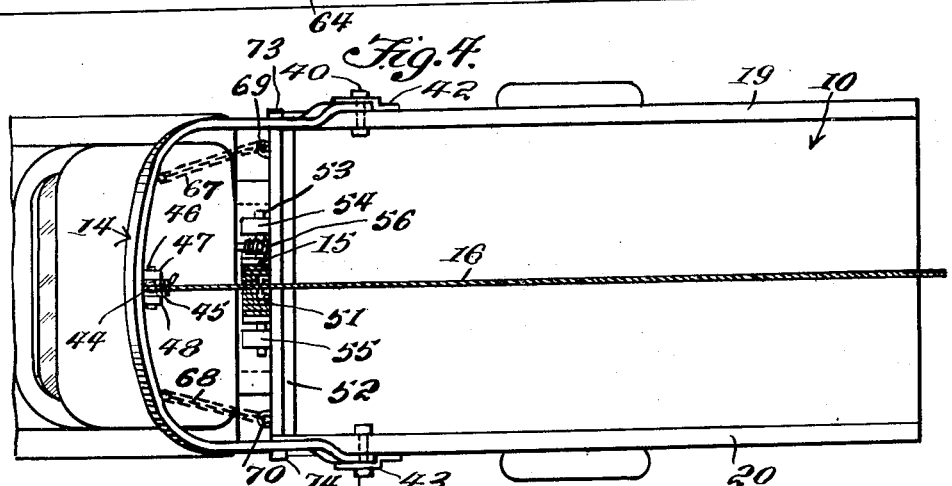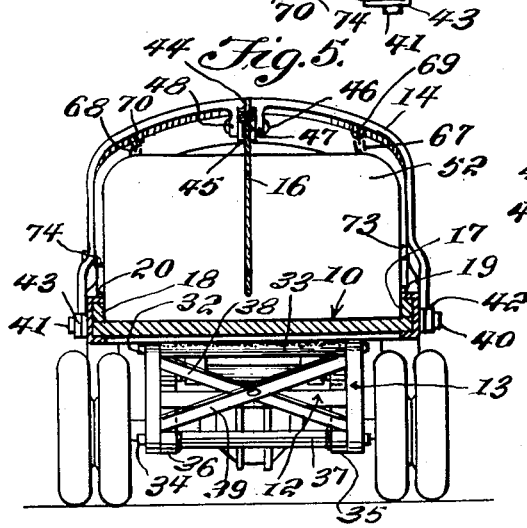

2,624,484

UNITED STATES PATENT OFFICE 2,624,484

LOADING DUMP TRUCK BODY

James E. Dalton, Crewe, Va.

Application June 15, 1950, Serial No. 168,366

6 Claims. (Cl. 214—504)

This invention relates to trucks particularly of the type used for hauling logs, lumber and similar products, and in particular a truck having a load carrying body pivotally mounted through rollers on the chassis with the rear portion of the body swingably connected to the chassis and with the load drawn upon the body and the body drawn upon the chassis by a cable extended from a winch over an A-frame structure.

The purpose of this invention is to facilitate loading logs, lumber and the like on trucks and the like.

This invention is an improvement over the truck loading dump body of my co-pending application filed June 26, 1947, with the Serial Number 757,087 and now Patent No. 2,550,230, granted April 24, 1951, in that the platform or bed of the body is mounted on rollers and the rear end thereof is pivotally connected to the chassis.

In the conventional method of loading logs, lumber and the like on a truck body it is necessary to pick up logs or lumber, one or one piece at a time, or in small bundles and this not only requires time and labor but is a difficult operation because it is very seldom that a truck can be placed where the products can be moved directly thereon. With this thought in mind this invention contemplates a truck body in which the rear end may be lowered to a convenient loading position and in which the load may readily be drawn upon the body and the body positioned on the chassis with a single cable.

The object of this invention is, therefore, to provide means for constructing a truck for carrying lumber, logs and the like whereby the truck body or bed may be lowered to a convenient loading position and then repositioned on the truck after the load is placed thereon.

Another object of the invention is to provide means for dropping a truck body downwardly to a convenient loading position without the body engaging the rear wheels of the truck.

A further object of the invention is to provide an improved loading and dumping body for trucks of the log and lumber hauling type which is of a comparatively simple and economical construction.

With these and other objects and advantages in view the invention embodies a truck body or bed mounted on wheels with a frame hingedly connecting the rear portion of the body to the rear of the chassis of a truck and with a cable extended from a winch over an A-frame structure pivotally mounted on the forward end of the body.

Other features and advantages of the invention will appear from the following description taken in connection with the drawings wherein:

Figure 1 is a side elevational view of a truck showing the improved loading and dumping body positioned thereon with the rear end of the body broken away.

Figure 2 is similar view showing the body in the loading position.

Figure 3 is a view similar to that shown in Figure 1 showing the improved truck body with a load thereon.

Figure 4 is a plan view of the truck with the parts in the position as illustrated in Figure 1.

Figure 5 is a rear elevational view of a truck showing the loading and dumping body thereon with the platform and side beams of the body shown in section.

Figure 6 is a cross section through the chassis taken on line 6—6 of Figure 3 showing the forward end of the improved loading body.

Figure 7 is a cross section through the truck taken on line 7—7 of Figure 3.

Figure 8 is a detail illustrating the hinging frame for attaching the truck body to the chassis with rollers at the ends of the frame shown in section.

Figure 9 is a cross section taken on line 9—9 of Figure 3 illustrating the latching elements for securing the loading body to the chassis.

Referring now to the drawings wherein like reference characters denote corresponding parts the improved loading body of this invention includes a platform 10, a truck 11 having a chassis 12, a frame 13 for swingably connecting the rear portion of the body to the chassis, a U-shaped A-frame 14, a winch 15 and a cable 16.

The body 10 is formed of side walls 17 and 18, the outer edges of which are protected by channels 19 and 20 and the body is supported on wheels 21 and 22 on the ends of an axle 23 that is journaled in a sleeve 24 carried by supports 25 and 26 on the under side of the body 10.

The wheels 21 and 22 are positioned to travel on tracks 27 and 28 on channels 29 and 30 that form the side beams of the chassis 12. The forward end of the track 27 is provided with a stop 31 and a similar stop is provided on the forward end of the track 28. With the body mounted in this manner it is free to roll rearwardly on the tracks when it is actuated to a loading or dumping position as shown in Figure 2 and as the body is drawn forwardly the wheels roll toward the stops 31 as shown in Figure 1.

The hinge frame 13 is provided with an upper shaft 32 that is journaled in a sleeve 33, welded or otherwise attached to the under surface of the body 10 and the opposite end of the frame is pivotally mounted on a pin 34 that is journaled in supports 35 and 36 extended downwardly from the rear ends of the beams 29 and 30 of the chassis 12. A spacing sleeve 37 is provided between the supports and the side members of the frame 13 are reinforced by diagonal braces 38 and 39.

The truss or A-frame structure 14 is formed by a substantially U-shaped bar, the lower ends of which are pivotally mounted by bolts 40 and 41 in brackets 42 and 43 and the upper end of which is provided with an eye 44 to which one end of the cable 16 is attached. A pulley 45, which is also positioned in the upper end of the frame is rotatably mounted on a shaft 46 in depending supports 47 and 48.

A pulley block 49 with a hook 50 thereon is carried by the cable and from the pulley 45 the cable extends through an eye 51 on a headboard 52 at the forward end of the body as shown in Figures 2 and 6. From the eye 51 the cable extends downwardly over the winch 15 which is mounted on a shaft 53 that is journaled in bearings 54 and 55 on the forward end of the chassis.

The winch 15 may be driven from the power take off of the truck through a worm 56 and a gear 57, as shown in Figure 6, or by any suitable means.

As illustrated in Figure 9 the forward end of the body 10 is provided with downwardly extended loops 58 and 59 that are positioned to receive latches 60 and 61 pivotally mounted in the chassis 12 by a rod 62. The latches are retained in the position of locking the truck body with the forward end downward as shown in Figure 1 by a spring 63 attached to the lower end of an arm 64 extended downwardly from the rod 62, the opposite end of the spring 63 being attached to an eye 65 on the chassis.

With the parts arranged in this manner the latches at the forward end of the truck body are released and with the cable 16 slack the body 10 is actuated to the position shown in Figure 2 by gravity and with the truck body in this position the hook 50 may be attached to a sling or cable around logs or lumber, as indicated by the numeral 66 and by actuating the winch the load is drawn upwardly on the body until the center of gravity of the load reaches a point spaced outwardly from the pivot point of the body on the rolls 21 and 22.

Continued tension on the cable and frictional resistance of the load on the body will cause the body to roll forwardly until the wheels 21 and 22 strike the stops 31. The frictional resistance keeping the center of gravity of the load beyond the pivot point of the body until the body rolls forward and is in an upright position, is the one factor that causes gravity to dump the body when unloading.

In the position of drawing in a load, the A-frame or boom 14 extends upwardly as shown in Figure 2 and the boom is held in this position by chains 67 and 68 which are attached to the head or end at the points 69 and 70 and to the boom at the points 71 and 72 respectively.

With the boom pivotally mounted on the truck it may be lowered so that it may be run into a garage and to prevent the upper end and pulley thereon dropping on the roof of the cab stops 73 and 74 are provided on the sides of the head 52. These stops are positioned in the path of the sides of the boom and wherein the boom may rest thereon.

With the body of the truck secured by the latches and with the forward end resting upon a block 75, as illustrated in Figures 1 and 3 the load may be conveyed to any suitable point where it may be dumped or dropped by releasing the cable and opening the latches.

The latches may be provided with a cable or bar 76 that may extend to a convenient point in the truck cab whereby the load may be released from the cab.

It will be understood that modifications may be made in the design and arrangement of the parts without departing from the spirit of the invention.

What is claimed is:

1. In a loading and dumping truck, the combination which comprises a chassis mounted on wheels, tracks having stops on the forward ends mounted on the chassis, a truck body positioned above the chassis, wheels journaled on the under side of the truck body and positioned to travel on the said tracks, links pivotally connected to the end portion of the chassis and also to the said truck body at a point spaced rearwardly from the rear end of the chassis for hingedly connecting the truck body to the chassis, an upwardly extended U-shaped frame pivotally mounted on the forward end of the truck body, a winch mounted in the chassis, a cable extended from the winch over a pulley in the upper end of the U-shaped frame and back to the frame, a pulley block having a hook extended therefrom carried by the cable, and means retaining the said truck body on the chassis.

2. In a loading and dumping truck, the combination which comprises a chassis mounted on wheels, tracks having stops on the forward ends mounted on the chassis, a truck body positioned above the chassis, wheels journaled on the under side of the truck body and positioned to travel on the said tracks, links pivotally connected to the rear end of the chassis and also to the rear portion of said truck body at a point spaced rearwardly from the end of said chassis for hingedly connecting the truck body to the chassis, an upwardly extended U-shaped frame pivotally mounted on the forward end of the truck body, a winch mounted in the chassis, a cable extended from the winch over a pulley in the upper end of the U-shaped frame and back to the frame, a pulley block having a hook extended therefrom carried by the cable, and means retaining the said truck body on the chassis, said links connecting the truck body to the chassis whereby the rear end of the truck body drops downwardly to a surface upon which the truck is positioned.

3. A loading and dumping truck comprising a truck chassis mounted on wheels, a truck body positioned above the chassis, wheels journaled on the under side of the truck body and positioned on the chassis, a frame hingedly connetcced to the rear portion of the said truck body and to the rear end of the chassis at a point spaced rearwardly from the rear end of the chassis, an upwardly extended frame pivotally mounted on the forward end of the said truck body, a cable extended from the chassis over the said upwardly extended frame and attached to the said frame, a pulley having a load carrying hook thereon carried by the cable, said cable extended to power means in the chassis, and a latch for retaining the said truck body in position on the chassis.

4. A loading and dumping truck comprising a truck chassis mounted on wheels, a truck body positioned above the chassis, wheels journaled on the under side of the truck body and positioned on the chassis, a frame hingedly connecting the rear portion of the said truck body to the rear end of the chassis, an upwardly extended frame pivotally mounted on the forward end of the said truck body, stops carried by the truck body for limiting forward movement of the upwardly extended frame, chains attached to the said upwardly extended frame and truck body for limiting rearward movement of the frame, a cable extended from the chassis over the said upwardly extended frame and attached to the said frame, a pulley having a load carrying hook thereon carried by the cable, said cable extended to power means in the chassis, and a latch for retaining the said truck body in position on the chassis.

5. A loading and dumping truck comprising a truck chassis mounted on wheels, trucks having stops on the forward ends mounted on the chassis, a truck body positioned above the chassis, wheels journaled on the under side of the truck body and positioned on the said tracks, means hingedly connecting the lower portion of the hinged frame to the rear end of the chassis, means hinging the upper portion of said hinged frame to the truck body at a point spaced rearwardly from the end of the chassis, an upwardly extended U-shaped frame mounted on the forward end of the said truck body, a winch positioned in the chassis, a cable extended from the winch over the said U-shaped frame with the end thereof attached to the said frame, a pulley block carried by the cable and a latch mounted in the chassis and positioned to engage a loop extended downwardly from the truck body for retaining the said truck body in position on the chassis.

6. In a loading and dumping truck, the combination which comprises a chassis mounted on wheels, tracks having stops on the forward ends mounted on the chassis, a truck body positioned above the chassis, wheels journaled on the under side of the truck body and positioned to travel on the said tracks, links pivotally connected to the rear end of the chassis, and also to the rear portion of said truck body at a point spaced rearwardly from the end of the said chassis for hingedly connecting the truck body to the chassis, an upwardly extended A-shaped frame mounted above the forward end of the truck body, a winch mounted in the chassis, a cable extended from the winch over a pulley in the upper end of the A-shaped frame and back to the frame, a pulley block having a hook extended therefrom carried by the cable, and means retaining the said truck body on the chassis, said links connecting the truck body to the chassis whereby the rear end of the truck body drops downwardly to a surface upon which the truck is positioned.

JAMES E. DALTON.

REFERENCES CITED

The following references are of record in the file of this patent:

UNITED STATES PATENTS

| Number | Name | Date |
| --- | --- | --- |
| 1,537,457 | Bryan | May 12, 1925 |
| 2,350,841 | Troche | June 6, 1944 |
| 2,405,299 | Godwin | Aug. 6, 1946 |
| 2,408,862 | Lisota | Oct. 8, 1946 |
| 2,482,413 | Gibson | Sept. 20, 1949 |
| 2,508,740 | Alvare | May 23, 1950 |
| 2,584,163 | Squires | Feb. 5, 1952 |
| 2,588,001 | Holland | Mar. 4, 1952 |

FOREIGN PATENTS

| Number | Country | Date |
| --- | --- | --- |
| 372,172 | Great Britain | May 5, 1932 |
| 500,450 | Great Britain | Feb. 9, 1939 |